United States Patent Office 3,014,923
Patented Dec. 26, 1961

3,014,923
PREPARATION OF ORGANIC SULFUR COMPOUNDS
Paul D. May, Galveston, Tex., assignor, by mesne assignments, to Standard Oil Company, Chicago, Ill., a corporation of Indiana
No Drawing. Filed Mar. 17, 1958, Ser. No. 721,626
4 Claims. (Cl. 260—329)

This invention relates to the preparation of thiophene and substituted thiophenes, and particularly concerns a method for preparing such compounds by the reaction of organic carbonyl compounds with hydrogen sulfide.

Heretofore thiophenes and substituted thiophenes have been prepared by reacting gamma diketones such as acetonylacetone with phosphorous sulfides at elevated temperatures on the order of 300° F. and higher ("The Chemistry of Heterocyclic Compounds," page 63, by H. D. Hartough, published by Interscience Publishers, Inc., 1952). I have discovered that this synthesis may be much more easily accomplished by using hydrogen sulfide in place of the phosphorous sulfide and carrying out the reaction in the presence of substantially anhydrous HCl at lower temperatures than heretofore used in the prior art technique discussed above. My invention also provides a method for separating the thiophene compound very readily from the organic carbonyl compound. My invention has for its objects these and certain other advantages which will be fully apparent from the detailed discussion of the invention.

This invention is based upon the discovery that thiophenes and substituted thiophenes can be prepared by reacting compounds corresponding to the formula:

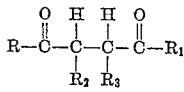

wherein R, R₁, R₂, and R₃ may be hydrogen or a hydrocarbon radical of up to about 16 carbon atoms, with gaseous H₂S in the presence of added substantially anhydrous HCl at a temperature below about 100° F. The reaction is preferably carried out in the presence of a solvent, such as ethanol, for the organic carbonyl compound. When using ethanol or similarly acting solvents, a separate phase of the thiophene compound forms in the reaction zone. The thiophene phase can readily be separated by decantation from the reaction products, and subsequently distilled to a very high purity.

Reaction temperatures below about 100° F., for example about 0 to 100° F. are used. The temperature may suitably be between about 30 and 75° F. While superatmospheric pressures may be employed in the reaction zone, such as might occur by pressuring the reactor with H₂S to pressures on the order of 200–1000 p.s.i.g., the reaction proceeds very readily at approximately atmospheric pressure. The process may very conveniently be carried out by introducing gaseous stream of hydrogen sulfide and substantially anhydrous hydrogen chloride gas into the reaction zone which contains the liquid organic carbonyl compound. Bubbling the gases through the carbonyl compound ordinarily provides sufficient agitation for effecting the reaction, but external agitation means may also be used if desired. Essentially complete conversion of the organic carbonyl compound to the product thiophene compound is obtained almost instantaneously as the reactants are contacted. The H₂S and anhydrous HCl gas may be passed into the reaction zone until essentially complete conversion to the thiophene compound results.

The organic carbonyl compound which may be employed in the reaction with H₂S may be one having the general formula

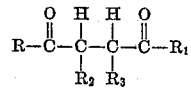

wherein R, R₁, R₂, and R₃ are either hydrogen or the same or different hydrocarbon radicals which may have between 1 and 16 carbon atoms. As is pointed out in the previously-mentioned text "The Chemistry of Heterocyclic Compounds" by Hartough, the synthesis is general to 1,4-diketones of the above structural formula. The chemical reaction which occurs in forming the thiophene may be illustrated as follows wherein acetonylacetone is reacted with H₂S:

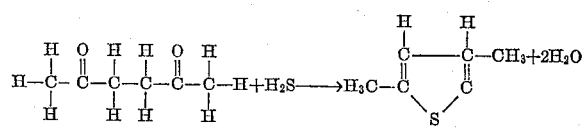

Illustrative of the invention is the following example. 60 grams of acetonylacetone were dissolved in 100 grams of ethanol. Hydrogen sulfide and anhydrous HCl were bubbled through the acetonylacetone solution at about 0° C. The reaction vessel was maintained at about atmospheric pressure. A white oil was rapidly formed. At the conclusion of the reaction, this white oil layer was separated from the ethanol layer by decantation and the white oil layer was characterized. Substantially all of the white oil layer boiled at about 136° C. (the boiling point of 2,5-dimethyl thiophene is reported as 136° C.). The weight percent sulfur found in the product was 28.8% (as compared with the calculated value for 2,5-dimethyl thiophene of 28.6%). The density $D_4^{20}$ was 0.98 as compared with the reported density $D_4^{19}$ of 0.986 for 2,5-dimethyl thiophene. The 2,5-dimethyl thiophene was made in 91 weight percent yield (purity of 99%) by distilling the white oil layer through a 15-plate Oldershaw column. While anhydrous HCl was used as a catalyzing agent, zinc chloride may also be employed for this purpose. The fact that the present invention permits one to use H₂S rather than phosphorous sulfide, and also permits one to use much lower temperatures than heretofore employed by the prior art, provides a much simplified process for the conversion of the aforementioned organic carbonyl compounds to thiophenes, homologues, and substitution products thereof.

Other modifications of the present invention, besides those described herein, will be apparent to those skilled in the art and are contemplated as coming within the scope of the appended claims.

What is claimed is:

1. A process for the preparation of 2,5-dimethyl thiophene which comprises introducing gaseous H₂S and substantially anhydrous HCl into a solution of acetonylacetone dissolved in ethanol, agitating the reactants at a temperature in the range of from 0 and 100° F., forming a separate phase of 2,5-dimethyl thiophene, and separating said 2,5-dimethyl thiophene phase from the reaction products.

2. The process of claim 1 wherein the reaction temperature is 0° C. and the reaction pressure is substantially atmospheric pressure.

3. A process for the preparation of 2,5-dimethyl thiophene which comprises reacting acetonylacetone with gaseous H₂S in the presence of substantially anhydrous HCl as the catalyst at a temperature in the range of from 0 to 100° F.

4. A process for the preparation of 2,5-dimethyl thiophene which comprises reacting acetonylacetone with gaseous $H_2S$ in the presence of substantially anhydrous HCl as the catalyst and in the presence of a solvent for acetonylacetone at a temperature in the range of from 0 to 100° F.

References Cited in the file of this patent

UNITED STATES PATENTS 2,600,838   Brooks _____ June 17, 1952

OTHER REFERENCES

Steinkopf et al.: Annalen der Chemie, vol. 501, page 189 (1933).

Paal: Berichte, vol. 18 (1955), pages 2251–2256.